(12) United States Patent
Gayden

(10) Patent No.: US 10,811,692 B2
(45) Date of Patent: Oct. 20, 2020

(54) METHOD OF MAKING ANODE COMPONENT BY ATMOSPHERIC PLASMA DEPOSITION, ANODE COMPONENT, AND LITHIUM-ION CELL AND BATTERY CONTAINING THE COMPONENT

(71) Applicant: Intecells, Inc., West Bloomfield, MI (US)

(72) Inventor: Xiaohong Gayden, West Bloomfield, MI (US)

(73) Assignee: Intecells, Inc., Southfield, MI (US)

( * ) Notice: Subject to any disclaimer, the term of this patent is extended or adjusted under 35 U.S.C. 154(b) by 0 days.

(21) Appl. No.: 16/678,693

(22) Filed: Nov. 8, 2019

(65) Prior Publication Data

US 2020/0075961 A1    Mar. 5, 2020

Related U.S. Application Data

(62) Division of application No. 15/847,154, filed on Dec. 19, 2017, now Pat. No. 10,522,840.

(Continued)

(51) Int. Cl.
*H01M 4/88* (2006.01)
*H01M 4/62* (2006.01)
(Continued)

(52) U.S. Cl.
CPC ........... *H01M 4/886* (2013.01); *H01M 2/145* (2013.01); *H01M 2/1653* (2013.01); *H01M 2/1673* (2013.01); *H01M 4/0404* (2013.01); *H01M 4/0419* (2013.01); *H01M 4/0426* (2013.01); *H01M 4/13* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/366* (2013.01);
(Continued)

(58) Field of Classification Search
CPC ...................................................... H01M 4/886
USPC ....................................................... 429/231.8
See application file for complete search history.

(56) References Cited

U.S. PATENT DOCUMENTS

2013/0143146 A1    6/2013   Huang et al.
2015/0349307 A1   12/2015   Dadheech et al.
(Continued)

FOREIGN PATENT DOCUMENTS

WO    2016/082120 A1    2/2016

*Primary Examiner* — James M Erwin
(74) *Attorney, Agent, or Firm* — Honigman LLP; Anna M. Budde

(57) ABSTRACT

An anode component for a lithium-ion cell is formed using an atmospheric plasma deposition. The anode component has an anode material layer comprising high lithium-intercalating capacity silicon particles as active anode material in pores of a bonded layer of metal particles. The atmospheric plasma deposition process deposits metal particles and smaller silicon-containing particles concurrently or sequentially on an anode current collector substrate or polymeric separator substrate for the lithium-ion cell. The anode material layer may optionally be lithiated in the atmospheric plasma deposition process. The plasma deposition process is used to form a porous electrode layer on the substrate consisting essentially of a porous metal matrix containing smaller particles of the electrode material particles supported and carried in the pores of the matrix. When the anode component is assembled into a cell, remaining pore capacity is filled with a lithium-ion containing liquid electrolyte solution.

11 Claims, 2 Drawing Sheets

Related U.S. Application Data

(60) Provisional application No. 62/476,787, filed on Mar. 26, 2017.

(51) Int. Cl.

| | | |
|---|---|---|
| H01M 4/133 | (2010.01) | |
| H01M 4/134 | (2010.01) | |
| H01M 4/36 | (2006.01) | |
| H01M 4/38 | (2006.01) | |
| H01M 4/48 | (2010.01) | |
| H01M 4/587 | (2010.01) | |
| H01M 4/04 | (2006.01) | |
| H01M 10/0525 | (2010.01) | |
| H01M 2/16 | (2006.01) | |
| H01M 4/66 | (2006.01) | |
| H01M 4/13 | (2010.01) | |
| H01M 2/14 | (2006.01) | |
| H01M 4/1393 | (2010.01) | |
| H01M 4/485 | (2010.01) | |
| H01M 4/1395 | (2010.01) | |
| H01M 4/02 | (2006.01) | |

(52) U.S. Cl.
CPC ........... *H01M 4/382* (2013.01); *H01M 4/386* (2013.01); *H01M 4/483* (2013.01); *H01M 4/485* (2013.01); *H01M 4/587* (2013.01); *H01M 4/626* (2013.01); *H01M 4/661* (2013.01); *H01M 10/0525* (2013.01); *H01M 2004/027* (2013.01)

(56) References Cited

U.S. PATENT DOCUMENTS

| | | |
|---|---|---|
| 2016/0056455 A1 | 2/2016 | Shibusawa |
| 2016/0254533 A1 | 9/2016 | Gayden |
| 2017/0121807 A1 | 5/2017 | Deng et al. |
| 2017/0237074 A1 | 8/2017 | Lopatin et al. |
| 2017/0301958 A1 | 10/2017 | Deng et al. |
| 2017/0309888 A1 | 10/2017 | Yu et al. |

METHOD OF MAKING ANODE COMPONENT BY ATMOSPHERIC PLASMA DEPOSITION, ANODE COMPONENT, AND LITHIUM-ION CELL AND BATTERY CONTAINING THE COMPONENT

CROSS-REFERENCE TO RELATED APPLICATIONS

This application is a division of U.S. patent application Ser. No. 15/847,154, filed Dec. 19, 2017, which claims the benefit of U.S. Provisional Patent Application No. 62/476,787, filed Mar. 26, 2017, each of which is hereby incorporated herein by reference in its entirety.

TECHNICAL FIELD

The present invention relates to electrodes of lithium-ion cells, methods of making such electrodes, and lithium-ion cells and batteries.

BACKGROUND

This section provides information helpful in understanding the invention but that is not necessarily prior art.

The use of lithium-ion batteries to power electric motors in automotive vehicles and in other high-energy devices and equipment has led to the need for higher gravimetric capacity and higher volumetric capacity batteries. While graphitic carbon is a durable and useful lithium-intercalating material for a negative electrode (anode) in lithium-ion cells, it has a relatively low capacity for such lithium insertion. Other potential electrode materials such as silicon (theoretical capacity, 3579 mAh/g for $Li_{15}Si_4$) and tin (theoretical capacity, 992 mAh/g for $Li_{22}Sn_5$) have much higher theoretical capacities than graphite for lithium insertion. However, the volume changes of up to 300 volume percent for silicon during lithiation and delithiation processes leads to the fracture of the active silicon material and a resulting loss of electrical contact with the conductive additives or with the current collectors to which the anode particles are attached. Tin has a like problem of large volume expansion upon lithiation, which again leads to rapid capacity degradation.

Electrodes containing silicon-based materials have been prepared by forming a slurry of silicon particles or silicon oxide ($SiO_x$) particles, graphite, and conductive carbon particles with a polymeric binder solution or dispersion. For example, Yu, International Application (PCT) Publication No. WO 2016/082120, which is hereby incorporated herein by reference in its entirety, describes forming a porous layer of electrode particles on a surface using an atmospheric plasma spray device. A non-plasma spray device is then used to spray an aqueous solution of polymeric binder material onto the porous layer. The water evaporates and the polymeric binder bonds the particles together and to the surface.

Gayden, US Patent Application Publication 2016/0254533, which is hereby incorporated herein by reference in its entirety, describes the use of an atmospheric plasma stream in making electrodes for lithium-ion cells and batteries. In the described method, particles of lithium-ion accepting and releasing electrode material are coated with or mixed with particles of conductive metals. The electrode material particles pre-coated with metal or mixed particles of metal and electrode material (for example either copper-coated silicon particles or a mixture of copper particles and silicon particles) are delivered into a plasma stream that partially melts the metal before being deposited on a substrate to form an electrode. The electrode material particles may be in the range of tens of nanometers to tens of microns. The US 2016/0254533 method is said to avoid the need for organic binders and allow deposition of thicker, lower stress layers of active electrode materials for higher cell capacity and power.

Deng et al., US Patent Application Publication 2017/0121807, which is hereby incorporated herein by reference in its entirety, describes methods of forming electrode material in which non-metallic particles of electrode material for a lithium secondary cell are coated with particles of an elemental metal before being placed in an atmospheric plasma stream and deposited in a continuous layer on a substrate. The metal particles are melted sufficiently during the deposition to bond the non-metallic electrode material particles to each other and to the substrate.

Deng et al., US Patent Application Publication 2017/0301958, which is hereby incorporated herein by reference in its entirety, describes atmospheric plasma spray depositing devices to sequentially form multiple layers of a lithium-ion cell for a lithium battery. Thus, a suitable substrate layer is conveyed past a series of plasma spray devices to form, in sequence, a current collector layer, a particulate electrode material layer, a porous separator layer, an opposing electrode layer, and a second current collector layer.

Yu et al., US Patent Application Publication 2017/0309888, which is hereby incorporated herein by reference in its entirety, describes coating active electrode material with a liquid precursor dispersion that, when exposed to an atmospheric plasma at a predetermined energy level and temperature up to 3500° C., is converted to carbon or metal oxide, and the carbon or metal oxide coated active electrode material is deposited onto a substrate in forming an electrode.

There remains a need for a method of forming lithium ion cell electrodes from materials with high theoretical capacities, such as silicon-containing and metal-containing negative electrode material structural compositions, that are more durable and maintain higher capacity during use in lithium-ion batteries.

SUMMARY

This need is met by the disclosed method for making an anode component by an atmospheric plasma deposition process and the disclosed anode component for a lithium-ion cell in which particles of an active anode material (that is, particles of lithium-ion accepting and releasing material, for example a high capacity lithium ion intercalating material such as silicon or a silicon-containing compound, particularly $SiO_x$) are deposited on a porous network of metal particles. This anode structure may be formed using atmospheric plasma application methods and equipment in a method in which nanometer-sized particles of the active anode material, for example silicon or $SiO_x$, are deposited (concurrently with, overlapping with, or subsequent to deposition of the metal particles) in the same plasma deposition device, from either the same or a different nozzle, and adhered on the surfaces and/or in the pores of a porous network formed by adhered, micrometer-sized particles of a metal such as copper. The porous metal layer may be formed by an atmospheric plasma deposition method in which particles of the metal are surface softened, surface melted, or surface energy activated such that the particles adhere to each other and to a substrate onto which they are deposited sufficiently to form a stable and durable porous network of particles in a layer on the substrate. The nanometer-sized particles of an active anode material are concurrently, overlappingly, or subsequently deposited from an atmospheric plasma of the same plasma deposition device (optionally from the same plasma and nozzle, or from a second plasma and a second nozzle) such that preferably at least a portion of the active anode material particles are adhered to the metal particles on outer surfaces and in pores of the porous metal layer. Other particles may not be adhered but may instead be trapped or immobilized in the anode material layer by particles that are adhered to metal particles. The porous network of adhered metal particles accommodates the expansion of the active (e.g., silicon-containing) anode material as it intercalates lithium ions from an electrolyte in cell operation such that the electrode avoids fracturing and damage during lithiation and delithiation processes. The porous metal network of adhered metal particles maintains the overall electrode layer dimensions while allowing nanometer-sized active anode material particles adhered on surfaces of metal particles (including inside pores of the porous structure) to expand and contract during lithiation and delithiation processes.

The atmospheric plasma application is a cold or non-thermal plasma application method, in contrast to thermal plasma methods that typically employ temperatures of 15,000° C. and higher. The atmospheric plasma application may be carried out at a temperature less than about 3500° C. or at a temperature less than about 2000° C.

In a preferred method, the anode component is formed by depositing metal particles from an atmospheric plasma through a first nozzle of a plasma device onto a substrate to form a porous network of adhered metal particles, wherein the metal is selected from the group consisting of metals of Group 1B, Group IVA, and Group VIII of the periodic table, alloys thereof, and combinations thereof and wherein the substrate is an anode current collector or a porous polymeric separator; and concurrently with, overlapping with, or subsequent to depositing the metal particles, depositing active anode material particles formed from a siloxane precursor in an atmospheric plasma through the first nozzle or through a second nozzle of the plasma device, wherein the active anode material particles comprise at least one member selected from the group consisting of silicon and $SiO_x$. The metal particles are from about 1 to about 15 micrometers and the active anode material particles from about 5 to about 900 nanometers. The active anode material particles adhere to the metal particles to form a layer of anode material on the substrate. A carbonaceous precursor may be included in the precursor vapor to form graphitic carbon in the active anode material particles; a source of lithium may be used to pre-lithiate the active anode material particles.

Other objects and advantages of the practices of this invention will be apparent from the following descriptions of illustrative embodiments.

BRIEF DESCRIPTION OF THE DRAWINGS

The embodiments can be better understood with reference to the following drawings and description. The components in the figures are not necessarily to scale, emphasis instead being place upon illustrating the principles of the embodiments. The drawings for illustrative purposes only of selected aspects and not all possible implementations, and are not intended to limit the scope of the present disclosure.

DETAILED DESCRIPTION

Definitions

Figure 1:
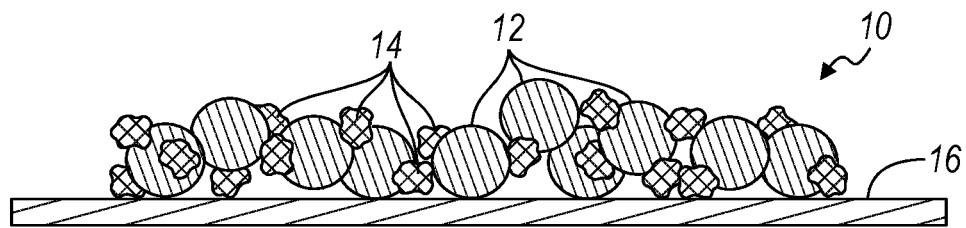
FIG. 1 is a schematic illustration of cross-section of layer of a plasma-deposited layer of metal particles carrying active anode material particles on a substrate (e.g., metal current collector foil or polypropylene separator substrate)

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. As used in this specification, the term "or" includes any and all combinations of one or more of the associated listed items.

"Adhered" when used to describe the attachment of the particles of the invention (metal particles to other metal particles or active anode material particles to metal particles) means a surface attachment of the particles while the particles do no fully melt into a molten mass and do not undergo a metallurgical change in the body of the metal particles. The metal particles adhere by surface softening, surface melting, or surface energy activation by the atmospheric plasma at a temperature up to about 3500° C.

"Atmospheric plasma deposition" or "atmospheric plasma application" refers to a plasma deposition method carried out at a temperature up to about 3500° C.

"Particle size" refers to average particle size as determined by the ISO 13320 test method.

A detailed description of exemplary, non-limiting embodiments follows.

The subject process forms high capacity anode structures for lithium-ion electrochemical cells using atmospheric plasma deposition methods and equipment to form either co-deposited, overlappingly-deposited, or sequentially-deposited particles of a metal surface softened, surface melted, or surface energy activated by the atmospheric plasma to form an adhered network of metal particle to which adhere particles of an active anode material (e.g., a silicon-containing active electrode material) on a suitable substrate for use in a lithium-ion electrochemical cell and battery. The active anode material is preferably formed in the plasma deposition process from a siloxane compound (present as a vapor in the plasma), which may be the same plasma used to deposit the metal particles or a second plasma depositing the active anode particles from a second nozzle of the same atmospheric plasma deposition device. The metal particle network containing particles of the active anode material adhere on a substrate that supports the anode structure in a cell or battery and interacts with the anode structure in the operation of the cell or battery. The active anode material may be formed in the plasma from a precursor such as a siloxane and may be deposited using the same nozzle or a second nozzle.

In the subject process an atmospheric plasma is generated inside a flow nozzle using plasma-heated inert gas such as nitrogen. For example, micron-sized copper particles and a suitable siloxane precursor such as vaporized hexamethyldisiloxane (HMDSO) are fed through separate openings respectively directed at the plasma stream to create a mix of surface softened, surface melted, or surface energy activated Cu particles and HMDSO vapor. The HMDSO decomposes to form nanometer-sized particles of $SiO_x$ (e.g., $SiO$—$SiO_2$ composite), which may for example be in the range of 5 nanometers to 900 nanometers or in the range of 50 to 800 nanometers or in the range of 50 to 750 nanometers. These nanoparticles of $SiO_x$ mix in the plasma stream with micro-sized copper particles and are directed through a nozzle against an otherwise unheated substrate surface. Upon engaging, for example, a copper current collector surface, the plasma stream is deflected and the $SiO_x$ particles and copper particles are collected and quenched to form a porous layer of adhered particles, preferably having a porosity of about forty to seventy percent of the superficial outer volume of the deposited material. Alternatively, in another embodiment of this process, copper particles and nanoparticles of silicon, silicon oxide-carbon composite, silicon-carbon composite, or a silicon alloy such as a Li—Si alloy are fed separately into the plasma nozzle and stream.

In general, the active anode material particles formed inside the plasma nozzle may be from about 5 or from about 10 or from about 50 or from about 100 or from about 200 nanometers up to about 900 or up to about 850 or up to about 800 or up to about 750 or up to about 700 nanometers. In various embodiments, the active anode material particles may be from about 200 to about 800 nanometers or from about 250 to about 750 nanometers or from about 250 to about 600 nanometers. In general, the metal particles may be from about 1 to about 15 micrometers or from about 1 to about 12 micrometers or from about 1 to about 10 micrometers or from about 1 to about 5 or from about 1 to about 3 micrometers. (Particle sizes are given as average particle sizes measured by ISO 13320.) The anode material layer contains a sufficient amount of the active anode material to provide a suitable anode capacity. In various embodiments, the active anode material particles occupy from about 5% to about 75% of the total volume, preferably from about 20% to about 70% of the total volume, and more preferably from about 20% to about 60% or from about 40% to about 70% or from about 40% to about 60% of the total volume of the anode material layer containing the metal particles and active anode material particles.

In various aspects of the disclosed methods and anodes, the porous metal layer may be formed of a metal or metals that may be selected from copper, tin, iron, nickel, titanium cobalt, chromium, tungsten, molybdenum, silver, gold, palladium, platinum, other metals from Groups 1B, IVA, and VIII of the periodic table, alloys of these such as stainless steel, and combinations of these, which may be formed in the metal using metal particles from about 1 to about 15 micrometers; the active anode material may be selected from silicon, oxides of silicon (particularly $SiO_x$ where x=1 or 2), $SiO_x$—C composites, silicon-carbon composites, silicon alloys such as Li—Si alloys, lithium titanate (lithium meta-titanate, $Li_2TiO_3$), and combinations of these.

In one aspect of this invention, an atmospheric plasma deposition method is employed to form a porous anode component for a lithium-ion battery. The anode material may be deposited as a porous layer on one or both sides of a metallic (e.g., copper) current collector foil or on a surface of a porous polymeric (e.g., polypropylene) separator layer. The current collector foil or the porous separator layer serves as a substrate for the plasma deposition process. The deposited porous layer is of a predetermined consistency, thickness, and area for use as an efficient anode material when infiltrated with a liquid lithium ion-containing electrolyte solution.

The present anode component structure is one having a porous particulate matrix of a conductive elemental metal such as copper, tin, or nickel (group IB, VIII, IVA), which is formed to contain and support smaller active anode material particles, such as silicon-containing (or tin-containing) active anode material particles. The metal particles are micrometer-sized while the active anode material particles are submicrometer-sized. The sizes of the plasma-deposited elemental metal particles are in the range of about 1-15 micrometers and the pores in the deposited layer are sized to carry and support the particles of active anode material. The active anode material may be particles smaller than 1 micrometer, preferably not more than about 900 nanometers, or not more than about 800 nanometers, such as from about 200 to about 800 nanometers, of elemental silicon, $SiO_x$ (e.g., $SiO$—$SiO_2$ composite), silicon oxide-carbon composites, silicon-carbon composites, or lithium alloys such as Li—Si alloys and may be plasma deposited as the active anode material. A co-deposited mixture of lithium or lithium alloy and tin or tin alloy may also be used as the anode material. The particles of active anode material are dispersed and adhered on the surfaces of the metal particles, including in pores between metal particles, of the deposited metal particle network layer. Thus, when the anode component is paired with a compatible cathode, and the electrodes infiltrated with a non-aqueous solution of a lithium-ion conducting electrolyte, the high capacity properties of the active anode material may be realized without damage to this new anode component.

The anode structure may be formed by a co-deposition of the elemental metal and the active anode material utilizing a suitable atmospheric plasma application device. Or the porous layer of elemental metal may be formed first with a subsequent atmospheric deposition of the particles of the selected anode material. It may be preferred or necessary to adapt different atmospheric plasma deposition conditions in forming the individual layers of the two member anode structure. In one embodiment, the deposition of the porous layer of elemental metal particles will be completed first. Then the plasma deposition of the smaller particles of anode material into the pores of the metal layer will be done concurrently or sequentially in the same plasma device, from the same or a second nozzle. The active anode material particles may include graphitic carbon if a carbon source, such as alkane like methane, ethane, or propane, is introduced along with siloxane precursor vapor into the plasma. Similarly, the active anode material particles can be lithiated by including a volatile liquid precursor containing lithium such as organic lithium amides in the precursor, or by sputtering a lithium wire in the plasma stream or by introducing nanometer-sized lithium particles, for example lithium particles with a protective carbonate coating, into the plasma stream at a temperature of at least about 700° C. The carbon or lithium modifiers may alternatively be applied using a plasma nozzle separate from the plasma nozzle used to deposit the active anode material particles in the same plasma device.

In one embodiment, $SiO_x$-graphite composite active anode material particles are formed by mixing in the same plasma nozzle a precursor vapor for $SiO_x$ (such as a tetraalkylsiloxane like tetraethylsiloxane or a hexaalkyldisiloxane such as hexamethyldisiloxane) and a secondary carbon source (such as an alkane like methane, ethane, or propane). The plasma nozzle may be the same plasma nozzle used to deposit the metal particles or it may be a second plasma nozzle in the same plasma deposition device as the plasma nozzle used to deposit the metal particles. Alternatively, the secondary carbon source may be introduced into the plasma nozzle used to deposit the metal particles and a second plasma nozzle in the same plasma deposition device may be used to deposit the silicon-containing active anode material particles.

Similarly, a lithiated (lithium-doped) active anode material, e.g. an $SiO_x$—Li composite or $SiO_x$—C—Li composite, may be formed by mixing an organic lithium precursor vapor in the same plasma nozzle with a precursor vapor for $SiO_x$ (such as a tetraalkylsiloxane like tetraethylsiloxane or a hexaalkyldisiloxane such as hexamethyldisiloxane) and optionally with a secondary carbon source (such as an alkane like methane, ethane, or propane). Examples of organic lithium precursors are lithium acetate, lithium bis (n-propyldimethylsilyl)amide, and lithium bis(trimethylsilyl)amide. The plasma nozzle may be the same plasma nozzle used to deposit the metal particles or it may be a second plasma nozzle in the same plasma deposition device as the plasma nozzle used to deposit the metal particles. Alternatively, the organic lithium precursor and/or the secondary carbon source may be introduced into the plasma nozzle used to deposit the metal particles and a second plasma nozzle in the same plasma deposition device may be used to deposit the silicon-containing active anode material particles.

In one embodiment, a porous layer of surface softened, surface melted, or surface energy activated metal particles are formed in the atmospheric plasma application device and deposited as a porous, generally uniformly thick layer of adhered metal particles on the selected substrate. Upon cooling the deposited material forms a porous metal matrix for a subsequent plasma deposit of smaller particles of active anode material. Suitable metal matrix materials include copper, tin, or nickel (group IB, VIII, IVA) for an anode for a lithium-ion battery. In certain embodiments, copper is one preferred metal for forming the porous conductive matrix. The selected metal may be introduced into the atmospheric plasma deposition nozzle as particles in a suitable carrier gas directed to the plasma stream or in the form of a wire which is sputtered in the plasma stream or evaporated inside the plasma nozzle. The power used in the atmospheric generator is controlled to deposit the metal particles at a suitable temperature and having particle sizes in the range of from about 1 to about 15 micrometers to form a generally uniformly thick, porous network of adhered metal particles that may be up to about 150 micrometers in thickness. The metal particles adhere to each other and to the substrate in forming an adherent porous layer. The pores of this metal particle matrix or network layer are intended and managed to provide reception sites for the smaller atmospheric plasma-deposited particles of a selected active anode material.

In some practices of the invention, submicrometer-sized particles of active anode material may be produced from a suitable precursor vapor in the plasma activation nozzle and co-deposited with the larger metal particles in the same plasma activation nozzle. The active anode material particle size may be controlled by process parameters such as precursor flow rate relative to metal particle feed rate, plasma power, temperature of the substrate, plasma working gas and flow rate, and traversing speed of the plasma nozzle head relative to the substrate. The smaller particles of active anode material are deposited on the surfaces and in the pores of the metal matrix layer. In other embodiments of the invention, the particles of active anode material are subsequently deposited on and into a formed metal matrix layer while the metal particles remain surface softened, surface melted, or surface energy activated. It may be desirable to use different atmospheric plasma conditions in forming a plurality of anode material layers as described in multiple successive passes of the plasma nozzle over the substrate to build a plurality of anode material layers up to 150 micrometers total thickness on the substrate. The formation of a plurality of anode layer of suitable thickness on the selected substrate may be accomplished or required by the deposition of one or more further layers of the combination of elemental metal particles and smaller particles of anode material. The layers may differ from one another in concentration and composition of the active anode material, metal matrix porosity, metal particle composition, network porosity, metal particle size, active anode material particle size, and any combination of these by varying the materials fed to the plasma, the relative feeing rates of materials to the plasma or plasmas, varying feed rate of the particles or precursor vapor(s), varying the power of the plasma, changing the rate at which the plasma nozzle is carried and moved relative to the substrate surface, or changing the distance between the nozzle and the substrate, or any combination of these.

Suitable anode materials include elemental silicon, $SiO_x$ (e.g., SiO—$SiO_2$ composite), $SiO_x$—C composites, silicon-carbon composites, lithium alloys such as Li—Si alloys, an alloy of lithium and tin (Li—Sn), an alloy containing lithium, silicon, or tin, or a combination thereof. A deposit of $SiO_x$ (e.g., SiO—$SiO_2$ composite) particles may be formed by introducing a precursor for the active anode material into the plasma environment. Examples of suitable precursors include hexamethyldisiloxane (HMDSO) or tetraethylsiloxane (TEOS), which may be decomposed in a suitable plasma stream in a plasma nozzle to form nano-sized particles of $SiO_x$ (x=1-2, e.g., SiO—$SiO_2$ composite).

In making the anode component for lithium batteries, porous anode layers may be deposited on both sides of a relatively thin copper current collector foil. In practices of this invention, the plasma-deposited metal and active anode material matrix may be deposited on one or both of the major surfaces of a suitable anode current collector foil. In other practices of the methods of this invention, the plasma-deposited metal matrix material and active anode material may be deposited on a major surface of a porous polymeric separator layer. For example, a porous polypropylene fiber structure may serve as the substrate when the nature of the surface of the polymeric separator does not allow the intrusion of plasma-deposited anode material into the pores of the separator. When the anode material is deposited on a major surface of a separator, a current collector foil will usually be applied or formed on the opposite side of the plasma-deposited anode structure.

In a specific illustrative example, a suitable non-thermal plasma sprayed mixture of $SiO_x$ and copper will be formed as a porous anode layer having a porosity of 40% to about 70% of the superficial volume of the layer. The electrode layer may be formed, for example, on a major surface of a copper current collector foil or on a receptive surface of a polymeric separator. Typically, the ratio of the volume of deposited $SiO_x$ to the volume of deposited copper is about 0.4-0.7 (or 2:3 to 2:5 parts by volume $SiO_x$ to copper).

The invention is further explained now with reference to the figures. With reference now to FIG. 1, a plasma-deposited layer 10 of metal (e.g., copper) particles 12 carrying active anode material (e.g., $SiO_x$) particles 14 is adhered on a metal (e.g., copper) current collector foil or on a polymeric (e.g., polypropylene) separator substrate 16. The deposited, adhered metal particles 12 and the deposited, adhered active anode material particles 14 are illustrated as generally spherical, but the plasma-deposited particles may have irregular shapes. The sizes of the particles are characterized by their largest dimension. And the porosity of the deposited layer may be determined as a proportion or percentage of its superficial volume as it extends outwardly from its supporting substrate.

The deposited, adhered metal particles 12 are larger than the deposited active anode material particles 14 and provide surfaces and pore volumes to which the active anode material particles 14 are adhered and for infiltration with a subsequently placed lithium ion-containing electrolyte solution. In general, the metal particles 12 need not be in any regular conformation, and the pore sizes can vary widely. The metal particles are are surface softened, surface melted, or surface energy activated such that the particles adhere to each other and to a substrate onto which they are deposited and have sufficient density to form a stable matrix or scaffold for the active anode material particles 14 to adhere such that the anode material layer is durable with good thermal and electrical conductivity.

Figure 2:
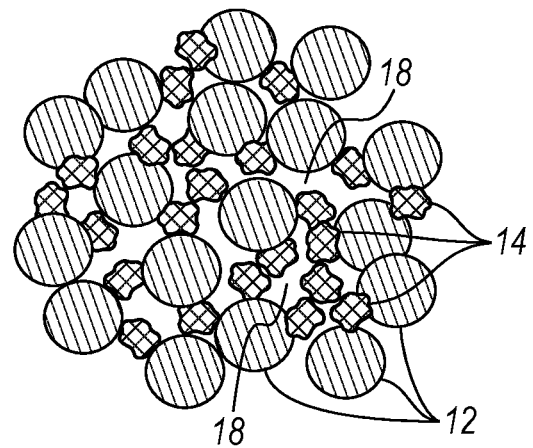
FIG. 2 is a schematic, two-dimensional top-view of a plasma-deposited porous layer of micrometer-sized metal particles with nanometer-sized active anode material particles carried on the surfaces of the metal particles and in pores between the metal particles.

FIG. 2 shows a schematic top-view of porous layer 10 made up of micrometer-sized metal particles 12 with nanometer-sized active anode material particles 14 adhered on the surfaces of the metal particles 12 and in pores 18 between the metal particles 12.

Figure 3:
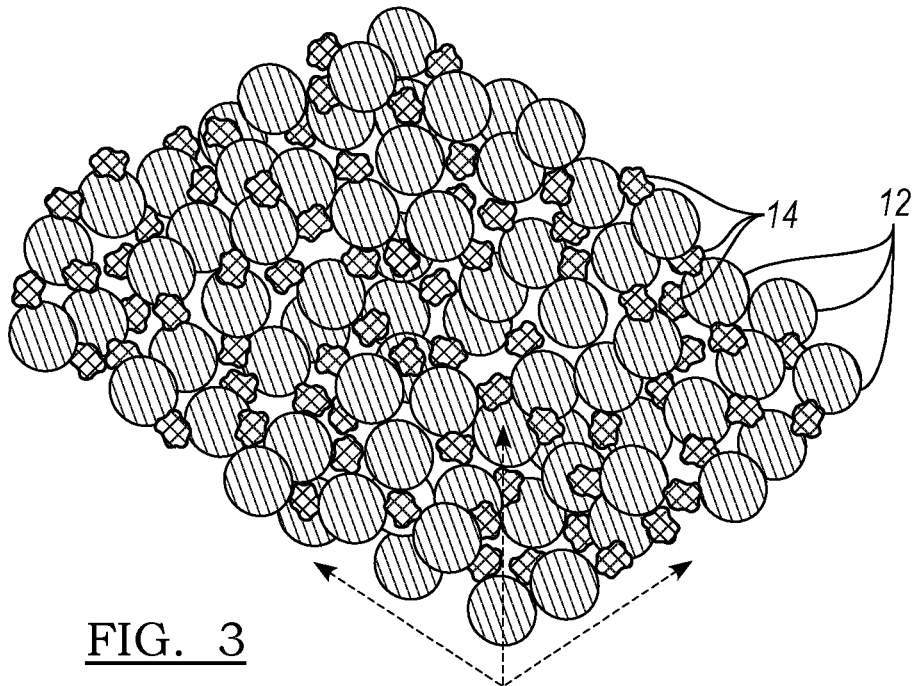
FIG. 3 is a schematic, three-dimensional view of a portion of a plasma deposited layer of micrometer-sized metal particles with nanometer-sized active anode material particles carried on the surfaces of the metal particles and in pores between the metal particles.

FIG. 3 is a schematic three-dimensional view of portion of plasma deposited layer 10 of micrometer-sized metal particles 12 with nanometer-sized active anode material particles 14 adhered on the surfaces of the metal particles 12 and in pores between the metal particles 12.

Figure 4:
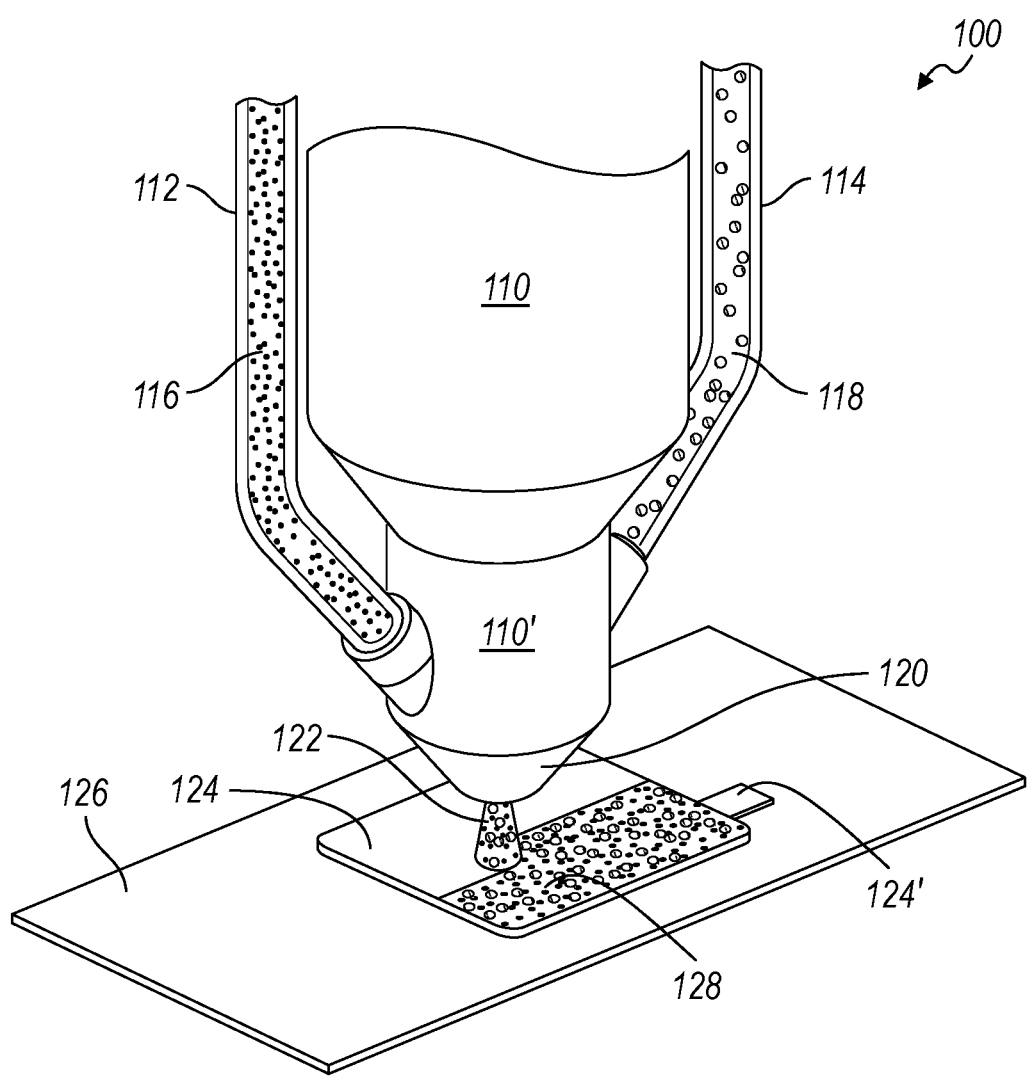
FIG. 4 is a schematic illustration of an apparatus having a powder delivery system and atmospheric plasma nozzle for delivering anode material components and applying them sequentially or together on a substrate in making the anode structure.

Atmospheric plasma deposition methods are known, and plasma spray nozzles are commercially available. Now with reference to FIG. 4, an atmospheric plasma apparatus 100 has an upstream round flow chamber 110 for introducing and conducting a flowing stream of suitable working gas, such as nitrogen, forming gas (nitrogen-hydrogen gas mixture), or an inert gas such as helium or argon. In this embodiment, this illustrative initial flow chamber 110 is tapered inwardly to smaller round flow chamber 110'. As described above, metal matrix particles for an anode include copper, tin, and nickel (group IB, VIII, IVA) particles. The active anode materials include silicon, silicon oxide ($SiO_x$), an alloy of lithium and silicon (Li—Si), an alloy of lithium and tin (Li—Sn).

Particles or precursors of the particles of selected material 116 are delivered through supply tubes 112 and are suitably introduced into the working gas stream in a main chamber and then carried into a plasma nozzle 120 in which the nitrogen (or other working gas) is converted to a plasma stream at atmospheric pressure. For example, particles of copper 116 may be delivered through a suitable supply tube 112 which is partially broken away to illustrate the flowing stream of copper particles. Siloxane precursor vapor 118 may be delivered through separate supply tube 114 which is partially broken away to illustrate the flowing supply of siloxane vapor 118. As the copper particles enter the plasma stream they are dispersed and mixed with the siloxane precursor vapor, which decomposes and forms nanometer-sized particles of a mixture of silicon oxides ($SiO_x$ particles) in it and carried by it. As the plasma stream flows through a downstream plasma-generator nozzle 120, the copper particles and $SiO_x$ particles formed in the formed plasma are heated by the formed plasma to a deposition temperature. The momentary thermal impact on the particles may be a temperature up to about 2000° C. As stated above in this specification, the metal particles are softened, surface melted, or surface energy activated in the plasma such that the particles adhere to each other and to the active electrode material particles.

The stream 122 of nitrogen-based plasma containing and carrying suspended electrode material particles is progressively directed by the nozzle against the surface of a substrate 124, such as a copper current collector foil for an anode for a lithium-ion cell. The substrate foil is supported on a suitable working surface 126 for the atmospheric plasma deposition process. The deposition substrate for the atmospheric plasma deposition is illustrated as an individual current collector foil 124 with its un-coated connector tab 124'. But it is to be understood that the substrate for the atmospheric plasma deposition may be of any size and shape for economic use and application of the plasma. It is also to be understood that suitable fixtures may be required to secure the substrate in place and/or a mask may be required to define the coated area or areas. And further, for example, specified smaller working electrode members may later be cut from a larger initially coated substrate. The nozzle is moved in a suitable path and at a suitable rate such that the particulate electrode material is deposited as a layer 128 of porous anode electrode material of specified thickness on the surface of the current collector foil substrate 124. The plasma nozzle may be carried on a robot arm and the control of plasma generation and the movement of the robot arm be managed under control of a programmed computer. In other embodiments of the invention, the substrate is moved while the plasma is stationary.

The layer of anode material particles may be lithiated during its plasma deposition to efficiently compensate for lithium capacity loss to significantly improve first cycle efficiency. This may be done, for example, in any one of three ways. In a first way, a wire of lithium metal may be placed in the plasma stream to be sputter deposited in the anode material layer as the layer is formed on the current collector or polymeric separator substrate. In a second method, an organic lithium precursor vapor may be mixed in the same plasma nozzle with a precursor vapor for $SiO_x$ and optionally with a secondary carbon source (such as an alkane like methane, ethane, or propane). Examples of organic lithium precursors are lithium acetate, lithium bis (n-propyldimethylsilyl)amide, and lithium bis(trimethylsilyl)amide. The plasma nozzle may be the same plasma nozzle used to deposit the metal particles or it may be a second plasma nozzle in the same plasma deposition device as the plasma nozzle used to deposit the metal particles. In a third method, particles of stabilized lithium metal particles (for example Li metal coated with lithium carbonate, $Li_2CO_3$) may be mixed and fed from supply tube 112 with the metal particles forming the porous metal layer or may be fed using an additional supply tube separate from supply tubes 112 and 114, and co-deposited by the atmospheric plasma deposition onto the substrate. The morphology and size of the lithium particles in the anode material layer can be controlled by position of entry along the plasma nozzle length, the power of the plasma, the wire feed speed, and/or by sequencing deposition of the lithium particles relative to deposition of the metal particles forming the porous network and the deposition of the active anode material particles (e.g., formed in the plasma stream from a precursor siloxane). In a preferred embodiment, the lithium metal reacts during deposition to form Si—Li alloy nanometer-sized particles in the anode material layer.

A lithium ion cell according to the invention is assembled with (in order) an anode current collector, an anode material layer of the invention comprising a porous layer of the metal particles carrying the active anode material particles on the metal particle surfaces and in voids between the metal particles, and optionally further comprising lithium; a porous polymeric separator layer; a cathode material layer (comprising, e.g., a mixed oxide or phosphate of lithium and another metal such as lithium-manganese oxide, lithium-nickel oxide, and/or lithium-cobalt oxide, lithium-manganese-nickel-cobalt oxide, lithium-nickel-cobalt-aluminum oxide, lithium iron phosphate, or combinations of these materials); and a cathode current collector. The anode material layer and cathode material layer may be located either on their respective sides of the separator layer or on their respective current collectors. It should be appreciated that the anode material layer of the invention may be formed on the anode current collector or on the anode side of the separator layer. Thus, when the anode component comprises the anode current collector and the anode material layer, the lithium ion cell may be assembled from the anode component, a porous polymeric separator layer; a cathode material layer, and a cathode current collector. When the anode component comprises the anode material layer and the separator layer, the lithium ion cell may be assembled from an anode current collector, the anode component of the invention, a cathode material layer, and a cathode current collector.

A lithium cell electrolyte, often a lithium salt (e.g., $LiPF_6$, $LiBF_4$, $LiClO_4$) dissolved in one or more organic solvents (e.g., ethylene carbonate, dimethyl carbonate), is carefully introduced into and between the closely spaced layers of the lithium ion cell assembly. Such lithium ion cell assemblies are well-known as described in many references, the present lithium ion cell being distinguished from those previously-known in that the inventive anode material layer is used. A lithium-ion battery according to the invention comprises at least one lithium ion cell according to the invention. In an embodiment of the lithium-ion battery, an anode material layer of the invention comprising a porous layer of the adhered metal particles carrying the active anode material particles adhered on the metal particle surfaces, including adhered to metal surfaces in voids between the metal particles, and optionally further comprising lithium is applied on each side of an anode current collector. In this embodiment, the battery is assembled with, outwardly from each side of the anode material layer, a porous polymeric separator layer; a cathode material layer; and a cathode current collector.

Disclosed is a method of forming an anode component for a lithium-ion electrochemical cell, comprising: depositing metal particles from a first atmospheric plasma through a first nozzle of a plasma device onto a substrate to form a porous network of adhered metal particles, wherein the metal is selected from the group consisting of metals of Group 1B, Group IVA, and Group VIII of the periodic table, alloys thereof, and combinations thereof and wherein the substrate is an anode current collector or a porous polymeric separator; and concurrently with, overlapping with, or subsequent to depositing the metal particles, depositing active anode material particles from the first atmospheric plasma through the first nozzle or from a second atmospheric plasma through a second nozzle of the plasma device, wherein the active anode material particles are less than 1 micrometer and smaller than the metal particles and comprise at least one member selected from the group consisting of silicon and $SiO_x$ wherein the active anode material particles adhere to the metal particles to form a layer of anode material on the substrate. In this method, the metal particles may be from 1 to 15, preferably from 1 to 10, more preferably from 1 to 5, most preferably from 1 to 3 micrometers and the metal is preferably selected from the group consisting of copper, tin, iron, nickel, titanium cobalt, chromium, tungsten, molybdenum, silver, gold, palladium, platinum, and stainless steel, more preferably selected from the group consisting of copper, tin, and nickel; the active anode material particles may be less than 1 micrometer, preferably from 200 to 800 nanometers, more preferably from 250 to 750 nanometers, and most preferably from 250 to 600 nanometers and the active anode material may contain carbon and is preferably lithiated, and the anode material layer may be formed on one major side of the polymeric separator or on one or both major sides of the anode current collector. An anode component made by the method is used to make a lithium ion electrochemical cell, which is turn is used to make a lithium ion electrochemical battery. According to the method, having any combination of the listed features, the active anode material particles may be formed in the first or second atmospheric plasma from a precursor, preferably comprising a siloxane vapor, more preferably hexaalkyldisiloxane such as hexamethyldisiloxane or tetraalkylsiloxane such as tetraethylsiloxane, optionally further comprising an organic carbon compound such as an alkane, preferably methane, ethane, or propane to provide active anode material particles comprising graphitic carbon and/or a volatile organic lithium compound such as lithium bis(trimethylsilyl)amide to provide lithiated active anode material particles. Whether or not the active anode material particles are formed in the plasma using a precursor, the active anode material particles may be lithiated via sputtering from a lithium wire, or from a vaporized lithium precursor in the plasma nozzle, or using lithium particles optionally comprising surface passivation deposited from an atmospheric plasma through the first nozzle, the second nozzle, or a third nozzle of the plasma device.

Any or all of the above listed embodiments of the method may be used to form a plurality of layers of anode material on the substrate having a total thickness of up to about 150 micrometers and wherein at least one member selected from the group consisting of metal particle composition, active anode material composition, concentration of active anode material, network porosity, metal particle size, active anode material particle size, and combinations thereof may vary between any two layers of the plurality of layers.

Also disclosed is a method of forming an anode component for a lithium-ion electrochemical cell, comprising: depositing metal particles from an atmospheric plasma through a first nozzle of a plasma device onto a substrate to form a porous network of adhered metal particles, wherein the metal is selected from the group consisting of metals of Group 1B, Group IVA, and Group VIII of the periodic table, alloys thereof, and combinations thereof and wherein the substrate is an anode current collector or a porous polymeric separator; and concurrently with, overlapping with, or subsequent to depositing the metal particles, depositing active anode material particles formed from a siloxane precursor in an atmospheric plasma through the first nozzle or through a second nozzle of the plasma device, wherein the active anode material particles comprise at least one member selected from the group consisting of silicon and $SiO_x$, optionally further comprising graphitic carbon formed in an atmospheric plasma in the plasma nozzle from an alkane gas and/or lithium formed in an atmospheric plasma in the plasma nozzle from an organic lithium compound or sputtered from a lithium wire, wherein the metal particles are from about 1 to about 15 micrometers and wherein the active anode material particles from about 5 to about 900 nanometers; and wherein the active anode material particles adhere to the metal particles to form a layer of anode material on the substrate.

Also disclosed is an anode component for a lithium-ion electrochemical cell, comprising an anode material layer on an anode current collector or on a polymeric separator, the anode material layer comprising a porous network of adhered metal particles having a particle size of from about 1 micrometer to about 15, preferably from 1 to 12, more preferably from 1 to 10, most preferably from 1 to 5 to from 1 to 3 micrometers, wherein the metal is selected from the group consisting of metals of Group 1B, Group IVA, and Group VIII of the periodic table, alloys thereof, preferably selected from the group consisting of copper, tin, iron, nickel, titanium cobalt, chromium, tungsten, molybdenum, silver, gold, palladium, platinum, and stainless steel, more preferably selected from the group consisting of copper, tin, and nickel; and active anode material particles comprising at least one member selected from the group consisting of silicon and $SiO_x$ optionally further comprising graphitic carbon and/or lithium, and having a particle size smaller than 1 micrometer, preferably from 200 to 800 nanometers, more preferably from 250 to 750 nanometers, and most preferably from 200 to 600 or from 250 to 600 nanometers, adhered to the metal particles, wherein the anode material layer comprises from about 5% to about 75% by volume, preferably from about 20% to about 60% by volume of the active anode material particles. The anode material layer may be a monolayer on the substrate or a plurality of layers on the substrate, optionally wherein at least one member selected from the group consisting of metal particle composition, active anode material composition, concentration of active anode material, network porosity, metal particle size, active anode material particle size, and combinations thereof varies between at least two of the plurality of layers, and either on one major side of the polymeric separator or on one or both major sides of the anode current collector. Also disclosed is a lithium ion electrochemical cell comprising the anode component and a lithium ion electrochemical battery comprising the lithium ion electrochemical cell.

What is claimed is:

1. An anode component for a lithium-ion electrochemical cell, comprising an anode material layer on an anode current collector or on a polymeric separator, the anode material layer comprising a porous network of adhered metal particles having a particle size of from about 1 micrometer to about 15 micrometers, wherein the metal is selected from the group consisting of metals of Group 1B, Group IVA, and Group VIII of the periodic table, alloys thereof, and active anode material particles comprising at least one member selected from the group consisting of silicon and $SiO_x$ and having a particle size smaller than 1 micrometer adhered to the metal particles, wherein the anode material layer comprises from about 5% to about 75% by volume of the active anode material particles.

2. An anode component according to claim 1, wherein the metal particles are from about 1 to about 10 micrometers and wherein the active anode material particles are from about 200 to about 800 nanometers.

3. An anode component according to claim 1, wherein the metal is selected from the group consisting of copper, tin, iron, nickel, titanium cobalt, chromium, tungsten, molybdenum, silver, gold, palladium, platinum, and stainless steel.

4. An anode component according to claim 1, wherein the active anode material further comprises a member selected from the group consisting of carbon and lithium.

5. An anode component according to claim 1, wherein the anode material layer comprises from about 20% to about 60% by volume of the active anode material particles.

6. An anode component according to claim 1, comprising a plurality of layers of the anode material wherein at least one member selected from the group consisting of
   metal particle composition, active anode material composition, concentration of active anode material, network porosity, metal particle size, active anode material particle size, and combinations thereof
varies between at least two of the plurality of layers.

7. A lithium ion electrochemical cell, comprising the anode component of claim 1.

8. A lithium ion battery, comprising the electrochemical cell of claim 7.

9. A lithium ion battery according to claim 8, wherein the anode material layer is on one major surface of a polymeric separator.

10. A lithium ion battery according to claim 8, wherein the anode material layer is on one major surface of an anode current collector.

11. A lithium ion battery according to claim 8, wherein the anode material layer is on both major surfaces of an anode current collector.

* * * * *